United States Patent
Wang et al.

(10) Patent No.: US 10,101,836 B2
(45) Date of Patent: Oct. 16, 2018

(54) ARRAY SUBSTRATE WITH DUAL GATE STRUCTURE TOUCH PANEL AND DISPLAY APPARATUS CONTAINING THE SAME

(71) Applicants: BOE TECHNOLOGY GROUP CO., LTD, Beijing (CN); Chengdu BOE Optoelectronics Technology CO.,Ltd, Chengdu (CN)

(72) Inventors: Benlian Wang, Beijing (CN); Benyin Ye, Beijing (CN); Youqiang Lu, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu (CN)

( * ) Notice: Subject to any disclaimer, the term of this patent is extended or adjusted under 35 U.S.C. 154(b) by 168 days.

(21) Appl. No.: 15/107,220

(22) PCT Filed: Dec. 28, 2015

(86) PCT No.: PCT/CN2015/099235
§ 371 (c)(1),
(2) Date: Jun. 22, 2016

(87) PCT Pub. No.: WO2017/016166
PCT Pub. Date: Feb. 2, 2017

(65) Prior Publication Data
US 2017/0031487 A1  Feb. 2, 2017

(30) Foreign Application Priority Data

Jul. 27, 2015 (CN) .......................... 2015 1 0447063

(51) Int. Cl.
*G06F 3/045* (2006.01)
*G06F 3/041* (2006.01)
(Continued)

(52) U.S. Cl.
CPC ........ *G06F 3/0412* (2013.01); *G02F 1/13338* (2013.01); *G06F 3/044* (2013.01); *G06F 2203/04103* (2013.01)

(58) Field of Classification Search
CPC .................. G06F 3/0412; G06F 3/044; G06F 2203/04103; G02F 1/13338
See application file for complete search history.

(56) References Cited

U.S. PATENT DOCUMENTS

| 9,170,692 B2 | 10/2015 | Yang et al. | |
| 2004/0004606 A1* | 1/2004 | Kodate | G09G 3/3659 345/204 |

(Continued)

FOREIGN PATENT DOCUMENTS

| CN | 102955637 A | 3/2013 |
| CN | 102955639 A | 3/2013 |

(Continued)

OTHER PUBLICATIONS

The State Intellectual Property Office of the People's Republic of China (SIPO) Office Action 1 for 201510447063.6 dated Jul. 4, 2017 18 Pages.

(Continued)

*Primary Examiner* — Rodney Amadiz
(74) *Attorney, Agent, or Firm* — Anova Law Group, PLLC (57) ABSTRACT

The present disclosure provides an array substrate. The array substrate includes a plurality of first lines along a row direction; a plurality of second lines along a column direction intersecting with the plurality of first lines to form a plurality of pixel units comprising a plurality of pixel electrodes in rows and columns; a plurality of touch electrodes in rows along the row direction and columns along the column direction; and a plurality of auxiliary lines along the column direction. Two first lines are between adjacent rows of pixel electrodes and two adjacent columns of the pixel electrodes form a pixel electrode group with one second line (Continued)

in between; and each auxiliary line is between two adjacent pixel electrode groups, each touch electrode being connected to at least one auxiliary line for transferring touch signals.

20 Claims, 7 Drawing Sheets (51) Int. Cl.
*G06F 3/044* (2006.01)
*G02F 1/1333* (2006.01)

(56) References Cited

U.S. PATENT DOCUMENTS

2011/0310035 A1\* 12/2011 Kim .................. G06F 3/0412
                                                    345/173
2014/0125626 A1\* 5/2014 Yang ................ G02F 1/134336
                                                    345/174
2016/0283032 A1    9/2016 Kim et al.

FOREIGN PATENT DOCUMENTS

| CN | 203133434 U | 8/2013 |
| CN | 103901675 A | 7/2014 |
| CN | 102650916 B | 11/2014 |
| CN | 104951143 A | 9/2015 |

OTHER PUBLICATIONS

The World Intellectual Property Organization (WIPO) International Search Report for PCT/CN2015/099235 dated May 10, 2016.

\* cited by examiner

Processing unit

Processing unit

ARRAY SUBSTRATE WITH DUAL GATE STRUCTURE TOUCH PANEL AND DISPLAY APPARATUS CONTAINING THE SAME

CROSS-REFERENCES TO RELATED APPLICATIONS

This patent application is a national phase entry under 35 U.S.C. § 371 of International Application No. PCT/CN2015/099235, filed on Dec. 28, 2015, which claims priority to Chinese Patent Application No. 201510447063.6, filed on Jul. 27, 2015. The above enumerated patent applications are incorporated by reference herein in their entirety.

TECHNICAL FIELD

The present invention generally relates to the display technologies and, more particularly, relates to an array substrate, a touch panel and a display apparatus containing the same.

BACKGROUND

Currently, touch display panels with integrated touch-sensing functions and display functions have been widely used. Commonly used touch-sensing display panels often include resistive touch panels, capacitive touch panels, and optical touch panels. Capacitive touch panels often have advantages such as high accuracy, multi-touch functions, and high touch-sensing resolution, and have become a main trend in touch display panels. Capacitive touch panels often include mutual-capacitance touch panels and self-capacitance touch panels. Compared to a mutual-capacitance touch panel, a self-capacitance touch panel often has a simpler structure, e.g., a relatively simple single-layered self-capacitance electrode structure. A self-capacitance touch panel often has higher detection sensitivity than a mutual-capacitance touch panel, and is generally cheaper than a mutual-capacitance touch panel. Thus, self-capacitance touch display panels have become popular.

BRIEF SUMMARY OF THE DISCLOSURE

The present disclosure provides an array substrate, touch display panel and display apparatus containing the array substrate. Using the array substrate provided by the present disclosure, no additional masks are required for forming the touch-sensing signal lines in the dual gate fabrication process, and the display aperture ratio would not be adversely affected.

One aspect of the present disclosure provides an array substrate. The array substrate includes a plurality of first lines along a row direction; a plurality of second lines along a column direction intersecting with the plurality of first lines to form a plurality of pixel units comprising a plurality of pixel electrodes in rows and columns; a plurality of touch electrodes in rows along the row direction and columns along the column direction; and a plurality of auxiliary lines along the column direction. Two first lines are between adjacent rows of pixel electrodes and two adjacent columns of the pixel electrodes form a pixel electrode group with one second line in between; and each auxiliary line is between two adjacent pixel electrode groups, each touch electrode being connected to at least one auxiliary line for transferring touch signals.

Optionally, each touch electrode is connected to a touch-sensing signal terminal through at least one touch-sensing signal line, the at least one touch-sensing signal line being connected to one touch-sensing signal terminal for transferring same touch signals.

Optionally, the touch-sensing signal line of a touch electrode is a first portion of an auxiliary line.

Optionally, the auxiliary line further comprises one or more second portions disconnected from the first portion, each second portion corresponding to and being electrically connected to a different touch electrode that is disconnected from the first portion of a same auxiliary line along the column direction.

Optionally, each touch electrodes in a first row is connected to at least one touch-sensing signal line and is not connected to second portions of any auxiliary line; and each touch electrodes in second rows is connected to at least one touch-sensing signal lines and at least one second portion of an auxiliary line. The first row is a row closest to the touch-sensing signal terminal, and the second rows are further away from the touch-sensing signal terminals than the first row.

Optionally, the touch electrodes in the second rows are each connected to at least one more second portion of an auxiliary line than an adjacent touch electrode along the column direction far away from the touch-sensing signal terminal.

Optionally, the auxiliary lines are in a same layer with at least one of the first lines and the second lines.

Optionally, the first lines are gate lines, and the second lines are data lines.

Optionally, the auxiliary lines are in a same layer with the data lines.

Optionally, the auxiliary lines and the data lines are in a same layer below the touch electrodes along a direction perpendicular to a plane of the array substrate.

Optionally, along a direction perpendicular to a plane of the array substrate, the auxiliary lines and the touch electrodes are in different layers, at least one auxiliary line being connected to corresponding touch electrodes through via holes.

Optionally, a touch electrode is electrically connected to at least one touch-sensing signal line.

Optionally, one touch electrode is electrically connected to two or more touch-sensing signal lines, the two or more touch sensing signal lines being connected to a same touch-sensing signal terminal for transferring same touch signals.

Optionally, the touch electrodes are self-capacitance touch electrodes.

Optionally, the auxiliary lines being disconnected from touch electrodes are shielding wires for shielding electrical fields.

Optionally, the array substrate further includes common electrodes. At least a portion of the common electrodes are touch electrodes.

Optionally, the first lines are data lines and the second lines are gate lines.

Another aspect of the present disclosure provides a display panel. The display panel includes one or more of the disclosed array substrates.

Optionally, the display panel further includes a processing unit, wherein the touch-sensing signal terminals are connected to a processing unit for configuring a touch motion.

Another aspect of the present disclosure provides a display apparatus. The display apparatus includes one or more of the disclosed display panels.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

For those skilled in the art to better understand the technical solution of the invention, reference will now be made in detail to exemplary embodiments of the invention, which are illustrated in the accompanying drawings. Wherever possible, the same reference numbers will be used throughout the drawings to refer to the same or like parts.

Figure 1:
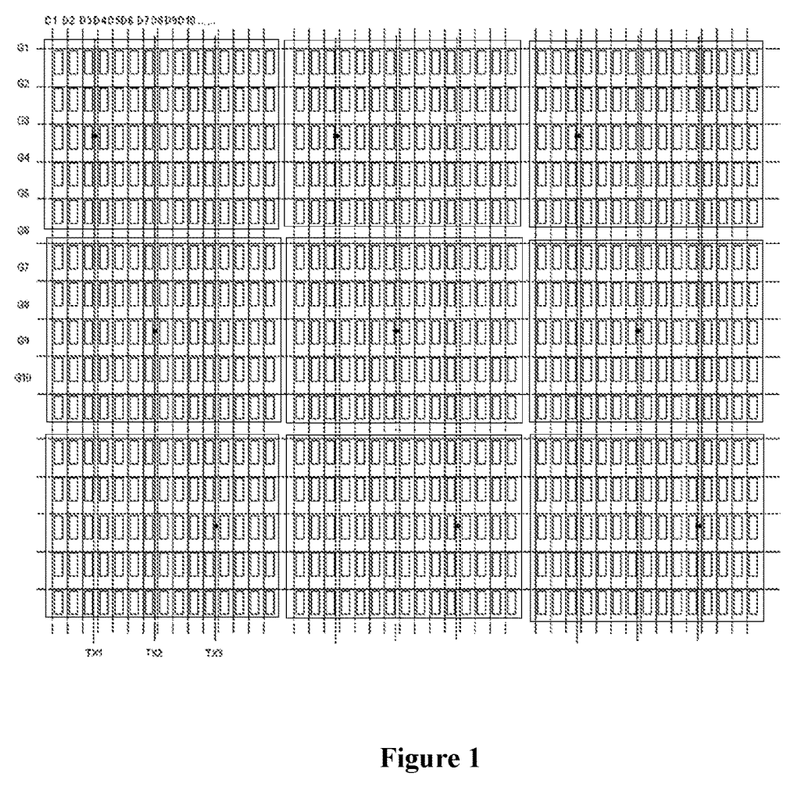
FIG. 1 illustrates a structure of an array substrate.

It has been found that, in a self-capacitance touch display panel, each touch electrode is required to be connected with at least one touch-sensing signal line to implement self-capacitance touch-sensing functions. The touch-sensing signal lines often do not have sufficient transparency and the arrangement would affect display aperture ratio. As shown in FIG. 1, in existing technologies, touch-sensing signal lines TXn (n=1, 2, 3, . . . , etc.) may be formed in a same fabrication step with gate lines Gn (n=1, 2, 3, . . . , etc.), or may be formed in a same fabrication step with data lines Dn (n=1, 2, 3, . . . , etc.). However, if the touch-sensing signal lines TXn are formed in the same layer as the gate lines Gn or the data lines Dn, to avoid short circuit, the touch-sensing signal lines TXn, the gate lines Gn, and the data lines Dn must be formed at different locations of the same layer. Because the location of the touch-sensing signal lines TXn does not have sufficient transparency, display aperture ratio can be adversely affected. If additional masks are used to separately fabricate touch-sensing signal lines TXn, the touch-sensing signal lines TXn can be arranged above the data lines Dn or the gate lines Gn. In this case, the display aperture ratio would not be affected but the additional mask and related process may be costly.

Figure 2:
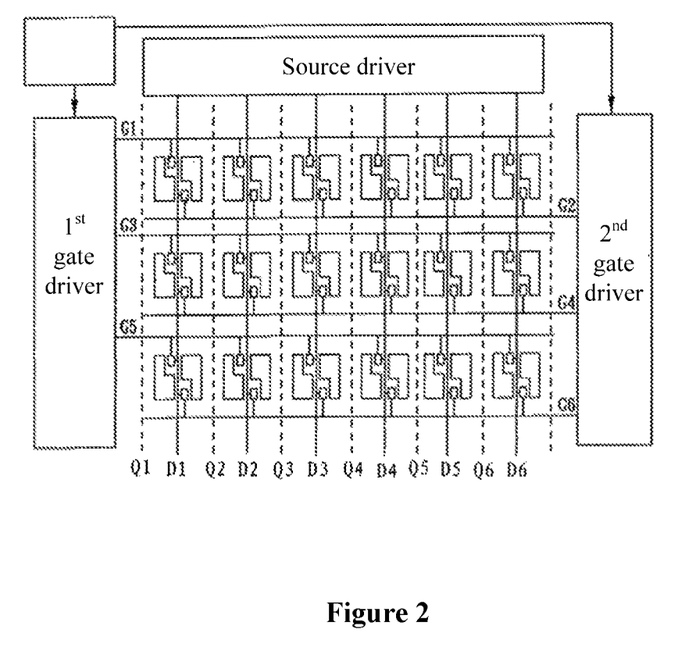
FIG. 2 illustrates a structure of an array substrate with dual gate structures.

In addition, as shown in FIG. 2, in existing dual gate fabrication, the number of gate lines Gn is doubled to reduce the number of data lines Dn by half. Less data lines Dn are used and the fabrication cost can be reduced. However, in the existing dual gate fabrication process, the data lines Dn often have imbalanced effects on the pixels, causing crosstalk between adjacent pixels. Also, no signal lines are arranged in the regions between adjacent data lines Dn, indicated by the dashed lines Qn (n=1, 2, 3, . . . , etc.) shown in FIG. 2. Black matrix is often used to block or cover the regions indicated by the dashed lines Qn, causing a waste of space in the touch display panel.

One aspect of the present disclosure provides an array substrate.

Embodiment One

An array substrate may include a plurality of first lines arranged along a row direction, a plurality of second lines arranged along a column direction, a pixel electrode array, and a plurality of touch electrodes. The intersections of first lines and second lines may be used to define pixel electrodes, i.e., the pixel electrodes may be formed in the areas defined by the plurality of intersections. Two first lines may be arranged between two adjacent rows of pixel electrodes. A plurality of pixel electrodes in a same row may be electrically connected to one of the two first lines adjacent to the row of pixel electrodes. Two adjacent columns of pixel electrodes may form a pixel electrode group. A plurality of pixel electrodes in a pixel electrode group may be connected to a same second line between the two columns of pixel electrodes in the pixel electrode group. The touch electrodes may be arranged in a plurality of rows along the row direction and a plurality of columns along the column direction. It should be noted that, in the disclosure, the term "intersection" may only be used to describe the relationship between at least two objects when view from a certain angle. The at least two objects may not be in a same layer. For example, the first lines and the second may have intersections when viewing from an angle perpendicular to array substrate, but the first lines and the second lines may not necessarily be formed in a same layer. That is, the projection of the first lines on the array substrate and the projection of the second lines on the array substrate may intersect.

Auxiliary lines may be arranged between at least some adjacent pixel electrode groups. In some embodiments, each auxiliary line may be positioned between two adjacent pixel electrode groups. At least some of the auxiliary lines may be touch-sensing signal lines. Each touch electrode may be electrically connected to at least one touch-sensing signal line. In some embodiments, each touch electrode may be electrically connected to at least one auxiliary line for transferring touch signals. The auxiliary lines that are connected to touch electrodes for transferring touch signals, i.e., used as touch-sensing signal lines, may be referred as touch-sensing signal lines.

In this disclosure, the term "auxiliary line" and the term "touch-sensing signal lines" may be described separately. However, it should be noted that, "touch-sensing signal lines" may refer to the portion of auxiliary lines with touch-sensing functions, and "auxiliary lines" may refer to the portion of auxiliary lines with no touch-sensing functions or not used as touch-sensing signal lines.

Figure 3:
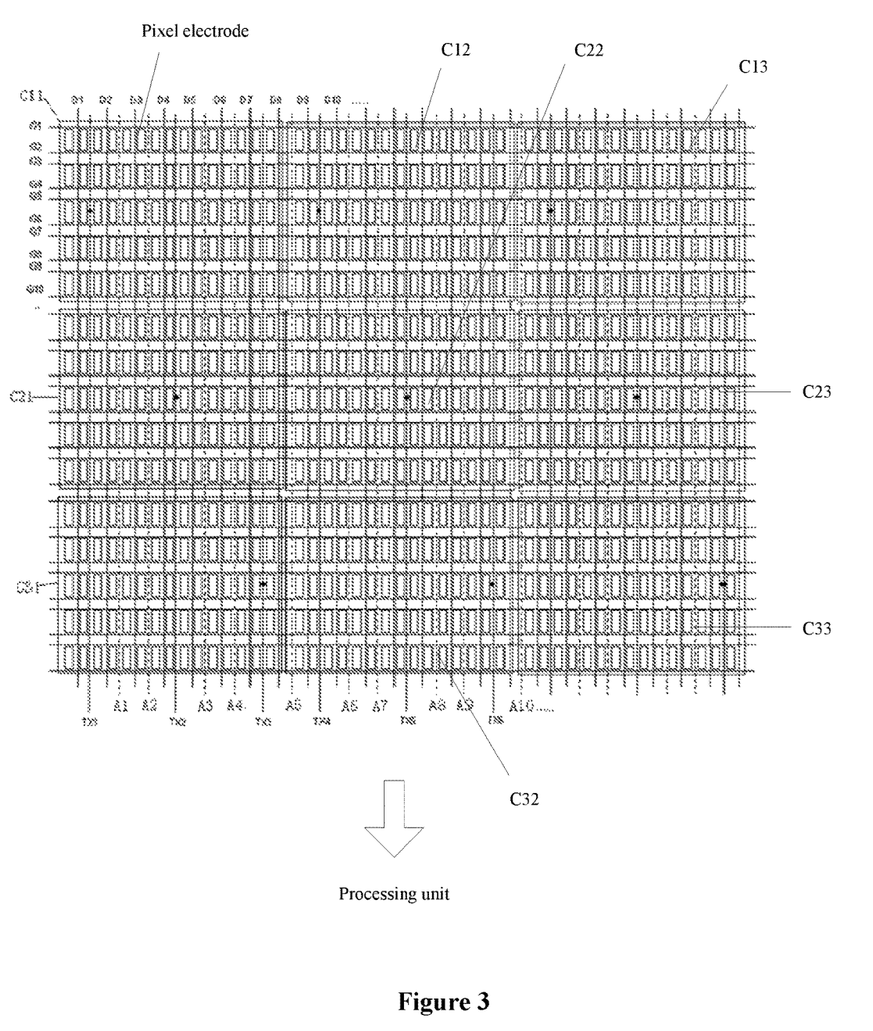
FIG. 3 illustrates a structure of an exemplary array substrate according to various disclosed embodiments of the present disclosure.

As shown in FIG. 3, the first lines may be gate lines Gn (n=1, 2, 3, . . . , etc.), and the second lines may be data lines Dn (n=1, 2, 3, . . . , etc.). The first lines may be arranged in rows along the row direction and the second lines may be arranged in columns along the column direction. Pixel electrodes may be illustrated by the rectangles in the areas defined by the intersections of the first lines and the second lines. As shown in FIG. 3, a plurality of pixel electrodes may be arranged in rows along the row direction and in columns along the column direction. A 3×3 array of touch electrodes, C11 to C31, as shown in FIG. 3, may be arranged along the row direction and the column direction. Two adjacent columns of pixel electrodes may form a pixel electrode group, and each auxiliary line may be positioned between two adjacent pixel electrode groups. For example, pixel electrodes in the first two columns shown in FIG. 3 may form a first pixel electrode group, indicated by "1st" in FIG. 3. Pixel electrodes in the third and fourth columns shown in FIG. 3 may form a second pixel electrode group, indicated by "2nd" in FIG. 3. A touch-sensing signal line, i.e., an auxiliary line connected to C11 for transferring touch signals, TX1, may be formed between the first pixel electrode group and the second pixel electrode group. TX1 may be connected to a touch-sensing signal terminal and used as a touch-sensing signal line for transferring touch signals between C11 and the corresponding touch-sensing signal terminal. The terms "first/1st" and "second/2nd" are only used for illustration purposes and would not indicate any order or difference in functions.

TX1 may be connected to the touch electrode C11. The electrical connection is indicated by the black dot on C11. In practice, the black dots may be solder joints between the touch electrodes and the corresponding touch-sensing signal lines. Similarly, TX2 may be electrically connected to the touch electrode C21, and TX3 may be electrically connected to the touch electrode C31. TX1, TX2, and TX3 may be connected to a same touch-sensing signal terminal or different touch-sensing signal terminals. As shown in FIG. 3, some auxiliary lines may not be used as touch-sensing signal lines, for example, A1 and A2. In this disclosure, the auxiliary lines not used as touch-sensing signal lines are illustrated as An (n=1, 2, 3, . . . , etc.). The auxiliary lines used as touch-sensing signal lines are illustrated as TXn (n=1, 2, 3, . . . , etc.). The specific arrangement of TXn and An may be subjected to different applications and/or designs and should not be limited by the embodiments of the present disclosure. It should be noted that, each touch electrode should be electrically connected to at least one touch-sensing signal line, i.e., at least one TXn. For example, in FIG. 2, each touch electrode, from C11 to C33, may be electrically connected to one touch-sensing signal line.

In operation, the touch-sensing signal lines TXn (n=1, 2, 3, . . . , etc.) may apply touch signals on the corresponding touch electrodes to detect touch motions. Signals reflecting touch motions may be transferred to a processing unit to be processed. The processing unit may configure the touch motion and respond accordingly. The auxiliary lines An (n=1, 2, 3, . . . , etc.) may or may not have specific functions.

In the array substrate provided by the present disclosure, pixel electrodes may be defined by the intersections of the first lines, arranged along the row direction, and the second lines, arranged along the column direction. The number of the first lines may be doubled and the number of the second lines may be reduced by half. Auxiliary lines may be arranged between adjacent pixel electrode groups and at least some auxiliary lines are used as touch-sensing signal lines. Each touch electrode may be electrically connected to at least one touch-sensing signal line. In one embodiment, the first lines may be the gate lines and the second lines may be the data lines. The array substrate may have a double gate line structure.

Compared to the structure of an existing array substrate, the number of data lines may be reduced by half and the fabrication cost may be lowered. Based on the existing dual gate structure, auxiliary lines may be arranged between two adjacent pixel electrode groups. The auxiliary lines may be used as touch-sensing signal lines. That is, the space often blocked or filled with black matrix may be more efficiently used. Thus, without reducing the display aperture ratio, the touch-sensing functions can be implemented simultaneously. It should be noted that, the present disclosure may also encompass a double data line structure, i.e., having the first lines as data lines and the second lines as gate lines, provided that the space blocked by black matrix can be utilized by arranging the auxiliary lines.

Embodiment Two

Another aspect of the present disclosure provides an array substrate. As shown in FIGS. 3 to 6, for example, the first lines may be gate lines and the second lines may be data lines. The array substrate may include a plurality of first lines arranged along a row direction, a plurality of second lines arranged along a column direction, a pixel electrode array, and a plurality of touch electrodes. The intersection of the first lines and the second lines may be used to define pixel electrodes, i.e., the pixel electrodes may be formed in the areas defined by the plurality of intersections. Two first lines may be arranged between two adjacent rows of pixel electrodes. A plurality of pixel electrodes in a same row may be electrically connected to one of the two first lines adjacent to the row of pixel electrodes. Two adjacent columns of pixel electrodes may form a same pixel electrode group. A plurality of pixel electrodes in a pixel electrode group may be connected to a same second line between the two columns of pixel electrodes in the pixel electrode group. The array substrates shown in FIGS. 3 to 6 may each be connected to a processing unit such that touch motions or other activities associated with the array substrate may be sent to the processing unit through certain signals. The processing unit may configure the signals and respond accordingly. For viewing simplicity, in FIGS. 4 to 6, a 3×3 array of touch electrodes is used to describe the disclosure and only touch electrodes C11, C21, and C31 are labeled.

Figure 4:
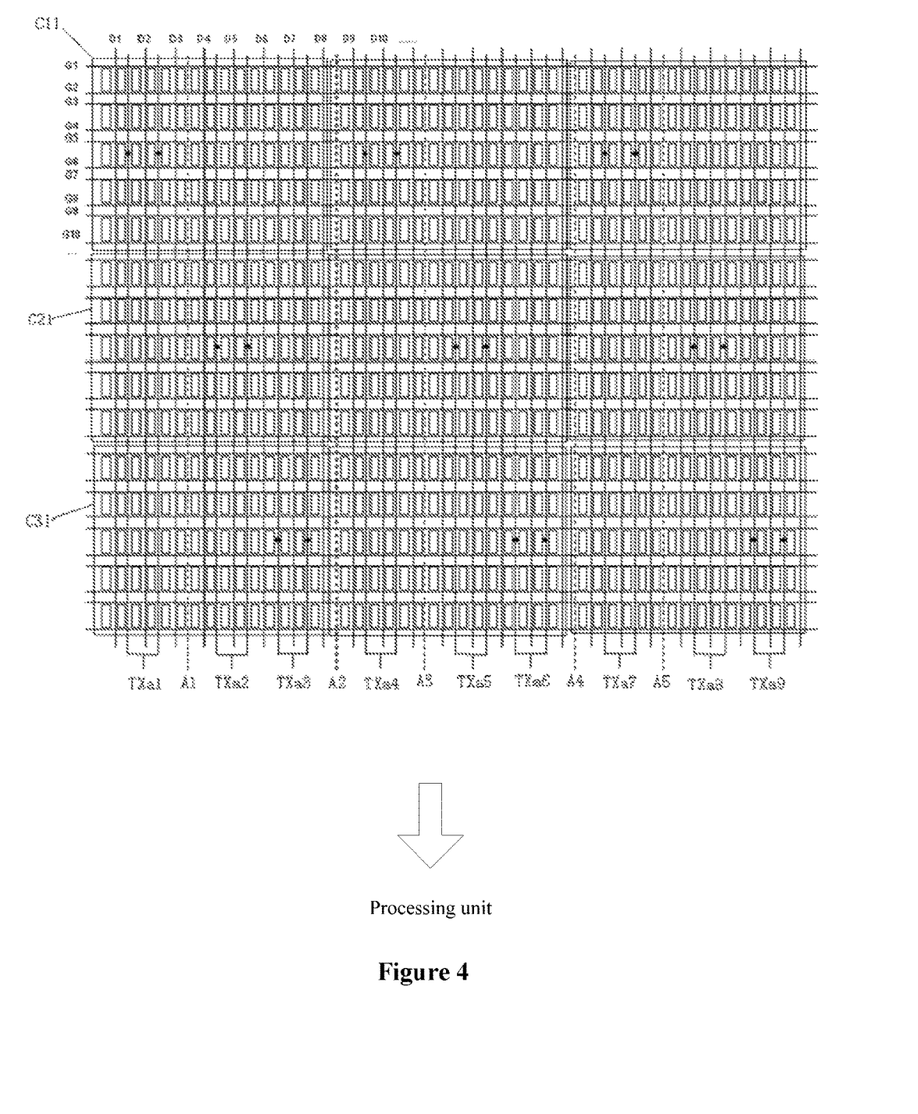
FIG. 4 illustrates a structure of another exemplary array substrate according to various disclosed embodiments of the present disclosure.
Figure 5:
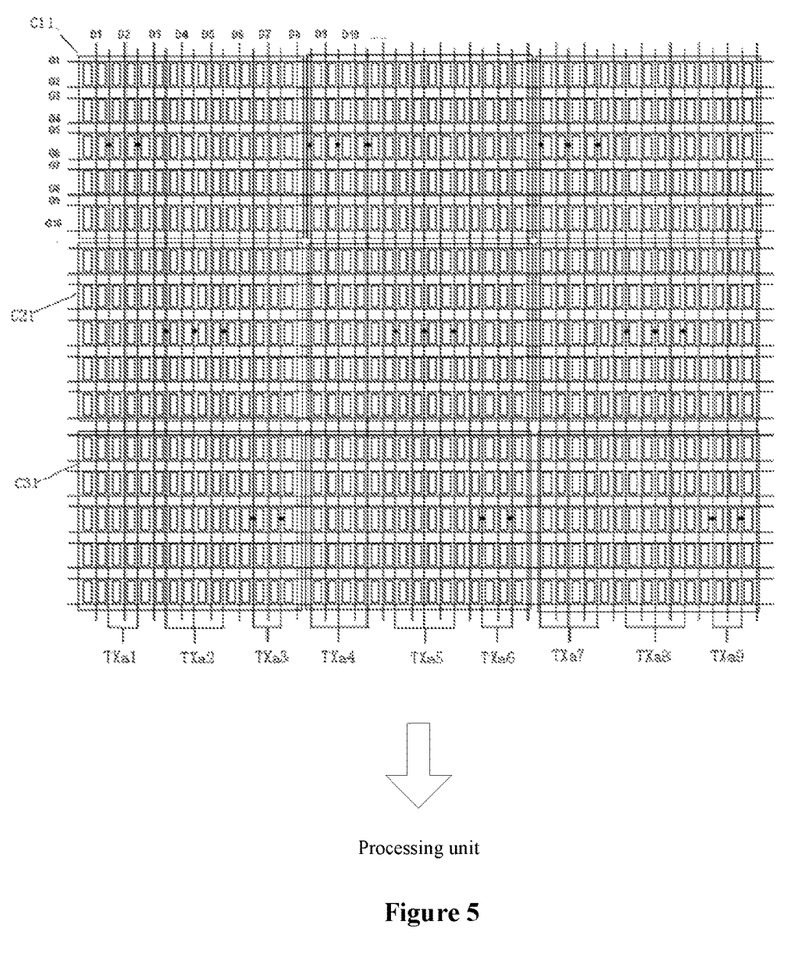
FIG. 5 illustrates a structure of another exemplary array substrate according to various disclosed embodiments of the present disclosure.
Figure 6:
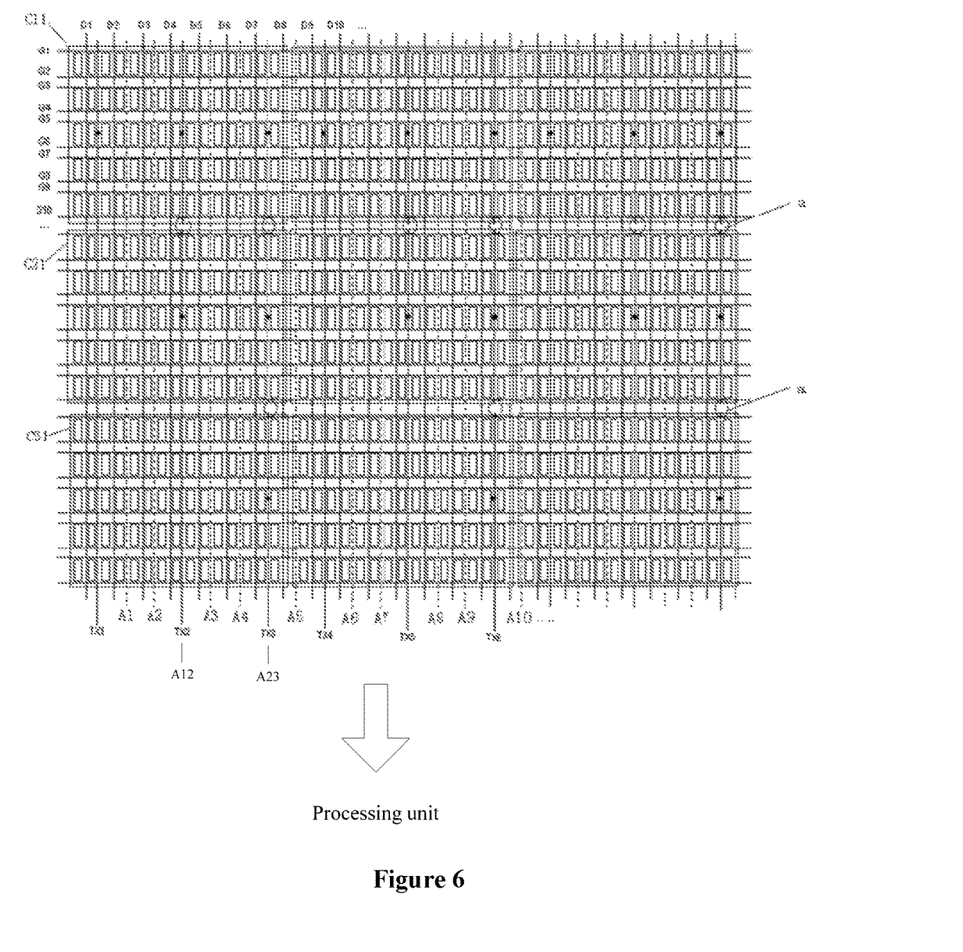
FIG. 6 illustrates a structure of another exemplary array substrate according to various disclosed embodiments the present disclosure.

As shown in FIGS. 3 to 6, auxiliary lines An (n=1, 2, 3, . . . , etc.), i.e., the auxiliary lines not used as touch-sensing signal lines, may be arranged between at least some adjacent pixel electrode groups. The auxiliary lines An may or may not have a specific function. At least some of the auxiliary lines may be used as touch-sensing signal lines TXn (n=1, 2, 3, . . . , etc.). Each touch electrode may be connected to at least one touch-sensing signal line TXn. For example, in FIG. 4, each touch electrode may be connected to two touch-sensing signal lines. In FIG. 5, each touch electrode may be connected to at least two touch-sensing signal lines. In FIG. 6, each touch electrode may be connected to one touch-sensing signal line.

The auxiliary lines An and the touch-sensing signal lines TXn may be in the same layer as the first lines. For example, the An, TXn and the first lines may be formed in a same, single fabrication process/step using a same material. In some embodiments, the auxiliary lines An and the touch-sensing signal lines TXn may be in the same layer as the second lines. That is, the auxiliary lines An may be in the same layer as the data lines, which may balance certain effect, e.g., resistive-capacitive (RC) delays, between the pixels. No additional mask is required for forming the auxiliary lines An and the touch-sensing signal lines TXn in a same layer with the first lines or the second lines.

In some embodiments, the two first lines adjacent to a row of pixel electrodes may be positioned on the two sides of the row along the column direction. That is, some of the pixel electrodes in one row may be connected to the adjacent first line positioned above the row, and the rest of the pixel electrodes in the row may be connected to the adjacent first line positioned below the row.

In some embodiments, the first lines may be gate lines Gn (n=1, 2, 3, . . . , etc.), and the second lines may be data lines Dn (n=1, 2, 3, . . . , etc.).

That is, as shown in FIG. 3, the double gate line structure may be used. The number of gate lines Gn (n=1, 2, 3, . . . , 10, . . . , etc.) may be doubled and the number of data lines Dn (n=1, 2, 3, . . . , 10, . . . , etc.) may be reduced by half. Auxiliary lines An (n=1, 2, 3, . . . , 10, . . . , etc.) may be arranged between adjacent pixel electrode groups and some of the auxiliary lines An may be used as touch-sensing signal lines TXn (n=1, 2, 3, . . . , 6, . . . , etc.). For example, the touch-sensing signal lines TX1 and the touch electrode C11 may be electrically connected; the touch-sensing signal lines TX2 and the touch electrode C21 may be electrically connected; the touch-sensing signal lines TX3 and the touch electrode C31 may be electrically connected; and so on. The black dots in FIGS. 3 to 6 may represent the electrical connection, e.g., formed by soldered joints, between a touch electrode Cn1 (n=1, 2, 3, . . . , etc.) and the corresponding touch-sensing signal lines TXn.

In some embodiments, the first lines may be data lines Dn (n=1, 2, 3, . . . , 10, . . . , etc.) and the second lines may be gate lines Gn (n=1, 2, 3, . . . , 10, . . . , etc.). The arrangement of other components on the array substrate may be according to the disclosure with the first lines being gate lines and the second lines being data lines.

In some embodiments, the auxiliary lines An (n=1, 2, 3, . . . , 10, . . . , etc.) and the touch-sensing signal lines TXn (n=1, 2, 3, . . . , 10, . . . , etc.) may be in the same layer as the second lines.

In some embodiments, each touch electrode Cn1 (n=1, 2, 3, . . . , etc.) may be connected to at least two touch-sensing signal lines TXn. The at least two touch-sensing signal lines TXn connected with the same touch electrode Cn1 may be connected to a same touch-sensing signal terminal TXan (n=1, 2, 3, . . . , etc.), as shown in FIGS. 4 and 5. A touch-sensing signal terminal TXan may provide a same touch signal to the at least two connected touch-sensing signal lines TXn.

That is, as shown in FIG. 4, the two touch-sensing signal lines TXn connected with the touch electrode C11 may be connected to TXa1; the two touch-sensing signal lines TXn connected with the touch electrode C21 may be connected to TXa2; the two touch-sensing signal lines TXn connected with the touch electrode C31 may be connected to TXa3; and so on. As shown in FIG. 5, the two touch-sensing signal lines TXn connected with the touch electrode C11 may be connected to TXa1; the three touch-sensing signal lines TXn connected with the touch electrode C21 may be connected to TXa2; the two touch-sensing signal lines TXn connected with the touch electrode C31 may be connected to TXa3; and so on. The greater the number of touch-sensing signal lines connected with each touch electrode Cn1, the larger the contact region between the touch-sensing signal lines and the corresponding touch electrode Cn1. Thus, more stable signals may be provided to each touch electrode.

In operation, the touch-sensing signal terminals TXan (n=1, 2, 3, . . . , etc.) may apply touch signals on the corresponding touch electrodes through the touch-sensing signal lines TXn (n=1, 2, 3, . . . , etc.) to detect touch motions. Signals reflecting touch motions may be transferred to a processing unit to be processed. The processing unit may configure the touch motion and respond accordingly. The auxiliary lines An (n=1, 2, 3, . . . , etc.) may or may not have specific functions.

In some embodiments, the touch electrodes Cn1 may be self-capacitance touch electrodes. That is, the display panel or the processing unit of the display panel may sense or detect touch motions through the change of capacitance on the touch electrodes.

In some embodiments, the auxiliary lines An, not used as the touch-sensing signal lines, may be shielding wires used for shielding electrical fields between adjacent pixel electrode groups.

That is, for example, in the dual gate structure, the data lines Dn may have imbalanced effect on the pixels and may cause crosstalk between adjacent pixels. Auxiliary lines An between adjacent pixel electrode groups may be used to shield electrical fields between adjacent pixel electrode groups.

In some embodiments, the array substrate may further include common electrodes. At least some of the common electrodes may be used as touch electrodes.

In some embodiments, along the direction perpendicular to the plane of the array substrate, the auxiliary lines An and the touch electrodes Cn1 may be arranged in different layers, and the auxiliary lines used as touch-sensing signal lines TXn may be connected to the touch electrodes Cn1 through via holes.

For example, in one embodiment, the auxiliary lines An, the touch-sensing signal lines TXn (n=1, 2, 3, . . . , etc.), and the data lines Dn (n=1, 2, 3, . . . , etc.) may be fabricated in the same layer. The auxiliary lines An, the touch-sensing signal lines TXn, and the data lines Dn may be arranged in the same layer below the touch electrodes along the direction perpendicular to the plane of the display panel or array substrate. Thus, the wiring of the touch-sensing signal lines TXn can be arranged properly.

In some embodiments, for example, in FIG. 6, along the direction perpendicular to the plane of the array substrate, a touch electrode Cn1 may correspond to at least one other auxiliary lines An or portions of at least one other auxiliary lines besides the corresponding touch-sensing signal line TXn. The portion of the at least one other auxiliary lines An, corresponding to the touch electrode Cn1, may be electrically connected to the touch electrode Cn1 and may be electrically connected in parallel to the touch-sensing signal line TXn that corresponds to the touch electrode Cn1. The at least one other auxiliary lines An may each have at least one disconnected location a (marked in circles and labeled as "a" in FIG. 6) along the column direction. The at least one other auxiliary lines An may be arranged above or below the corresponding touch electrodes Cn1 and may be electrically insulated from each other.

The embodiment is illustrated using auxiliary lines A12 and A23. It should be noted that, A12 and A23 may represent the auxiliary lines before being disconnected. After being disconnected, the first portion of A12/A23 for being used as touch-sensing signal lines may be referred as TX2/TX3, as shown in FIG. 6.

As shown in FIG. 6, an auxiliary line An may include at least one disconnected location a, as shown in FIG. 6. The at least one disconnection location a may disconnect or divide an auxiliary line An into at least two portions. The portion used as the a touch-sensing signal line of a touch electrode may be referred as a first portion. A portion not used as touch-sensing signal lines of any touch electrodes may be referred as a second portion. Each second portion may be disconnected from the first portion of the same auxiliary line along the column direction. Each second portion may correspond and be electrically connected to one touch electrode that is disconnected from the first portion along the column direction. Each second portion may be connected in parallel to the touch-sensing signal line of the corresponding connected touch electrode. For example, in FIG. 6, touch electrode C11 may be connected to the touch-sensing signal line TX1. An auxiliary line A12 may be disconnected at a between touch electrodes C11 and C21. The first portion of the disconnected auxiliary line A12, which is the portion closer to the corresponding touch-sensing signal terminal, may be used as the touch-sensing signal line TX2 for touch electrode C21. The second portion of the disconnected auxiliary line A12, i.e., the portion further away from the corresponding touch-sensing signal terminal, may be electrically connected to the touch electrode C11. The second portion of the auxiliary line A12, independent from the first portion, may be connected in parallel to the touch-sensing signal line TX1 of touch electrode C11.

Similarly, auxiliary lines A23 may be disconnected at a's between touch electrodes C11 and C21, and between touch electrodes C21 and C31. The first portion of disconnected auxiliary lines A23, which is the portion closest to the corresponding touch-sensing signal terminal, may be used as the touch-sensing signal line TX3 for touch electrode C31. The two second portions of the disconnected auxiliary lines A23, i.e., the two portions further away from the corresponding touch-sensing signal terminal, may be electrically connected to the farthest touch electrode C11 and the second farthest touch electrode C21. The second portion corresponding to and being electrically connected to touch electrode C21 may be connected in parallel to the touch-sensing signal line of touch electrode C21, which is TX2. The second portion corresponding to and being electrically connected to touch electrode C11 may be connected in parallel to the touch-sensing signal line of touch electrode C11, which is TX1.

That is, the touch electrode C11 is not only electrically connected to the touch-sensing signal line TX1, but also electrically connected to the two second portions of two auxiliary lines A12 and A23. The second portions of auxiliary lines A12 and A23 may be the portions further away from the corresponding touch-sensing signal terminals. The two second portions of auxiliary lines A12 and A23, corresponding and being connected to touch electrode C11, may thus be connected in parallel with the touch-sensing signal line TX1. Thus, the resistance of the touch-sensing signal line TX1 of touch electrode C11, being farthest away from the corresponding touch-sensing signal terminal, may be greatly reduced.

Similarly, except for being electrically connected to the touch-sensing signal line TX2, the second farthest touch electrode C21 may also be connected to the second portion of the auxiliary line A12. Thus, the resistance of the touch-sensing signal line TX2 of touch electrode C21, being second farthest away from the corresponding touch-sensing signal terminal, may be reduced.

The touch electrode C31, in a row closest to the corresponding touch-sensing signal terminal, may be electrically connected to the touch-sensing signal line TX3. Touch electrode C31 may not be connected in parallel with a second portion of any auxiliary line.

In the disclosure, the row of touch electrodes being closest to the touch-sensing signal terminals may be referred as the first row, e.g., the row touch electrode C31 is located. The rows of touch electrodes being further away from the touch-sensing signal terminals may be referred as second rows, e.g., the rows touch electrodes C21 and C11 are located. It should be noted that, "first row" and "second row" are only used for illustrative purposes and do not indicate any difference in functions or orders of the rows. Each touch electrodes in a first row may be connected to at least one touch-sensing signal line and may not be connected to second portions of any auxiliary line. Each touch electrodes in second rows may be connected to at least one touch-sensing signal lines and at least one second portion of an auxiliary line, As shown in FIG. 6, the touch electrodes in the second rows, e.g., C11 and C21, are each connected to at least one more second portion of an auxiliary line, A12 or A23, than an adjacent touch electrode along the column direction far away from the touch-sensing terminal. For example, C11, being the furthest from the touch-sensing signal terminal, may be connected to a second portion of auxiliary line A12 and a second portion of auxiliary line A23. C21, being the second furthest from the touch-sensing signal terminal, also being adjacent to C11 along the column direction towards the touch-sensing signal terminal, may be connected to a second portion of auxiliary line A12. Thus, touch-sensing signal lines of the touch electrodes located further away from the touch-sensing signal terminals may have reduced resistance to the corresponding touch-sensing signal terminals. Touch performance of the array substrate may be improved.

It should be noted that, the number of second portions connected to a touch electrode should be subjected to conditions such as the distance between a touch electrode to the corresponding touch-sensing signal terminal, the number of corresponding touch electrodes, and/or different applications, and should not be limited by the embodiments of the present disclosure. For illustrative purposes, the present disclosure only includes a 3×3 array of touch electrodes. In practice, an array with more touch electrodes may be used in the array substrate for touch functions. The specific number of touch-sensing signal lines connected to each touch electrode should not be limited by the embodiments of the present disclosure. Also, the specific number of second portions of auxiliary lines, defined as above, connected to each touch electrode, should also not be limited by the embodiments of the present disclosure. It may only be required that a touch electrode that is further away from the corresponding touch-sensing signal terminal to be connected to more second portions of auxiliary lines for reducing the resistance of the touch-sensing signal line of the touch electrode.

It should also be noted that, as shown in FIGS. 3 to 5, the auxiliary lines An and the touch-sensing signal lines TXn may have the same lengths or initial length. In FIG. 6, because some auxiliary lines, e.g., A12 and A23, are each disconnected to form a first portion and at least one second portions, the total lengths of the disconnected portions of one auxiliary line may still be equal to the initial length.

Because signals transmitted from a location farther away from the touch-sensing signal terminal often undergo a longer RC delay, using the arrangement described above, the RC delay applied on each touch electrode C11, C21, and C31 may be sufficiently close or substantially the same. The array substrate may have more balanced sensitivity to touch motions. The display of the array substrate may be more stable. Voltages or signals on the common electrodes may be more stable.

In some embodiments, the first lines may be data lines and the second lines may be gate lines.

That is, in some other embodiments, a double data line structure may be used. The number of data lines Dn may double and the number of gate lines Gn may be reduced by half. Auxiliary lines An may be arranged between adjacent pixel electrode groups. Some of the auxiliary lines An may be used as touch-sensing signal lines TXn. The touch-sensing signal lines TXn may be electrically connected to the corresponding touch electrode.

Embodiment Three

Another aspect of the present disclosure provides a display panel. The display panel may include the disclosed array substrates.

It should be noted that, the embodiments described above may have many variations. For example, in FIGS. 3 to 6, only 9 touch electrodes are used for illustrating the disclosure. The display panel or the array substrate may also include any numbers, more or less than 9, of touch electrodes.

Figure 7:
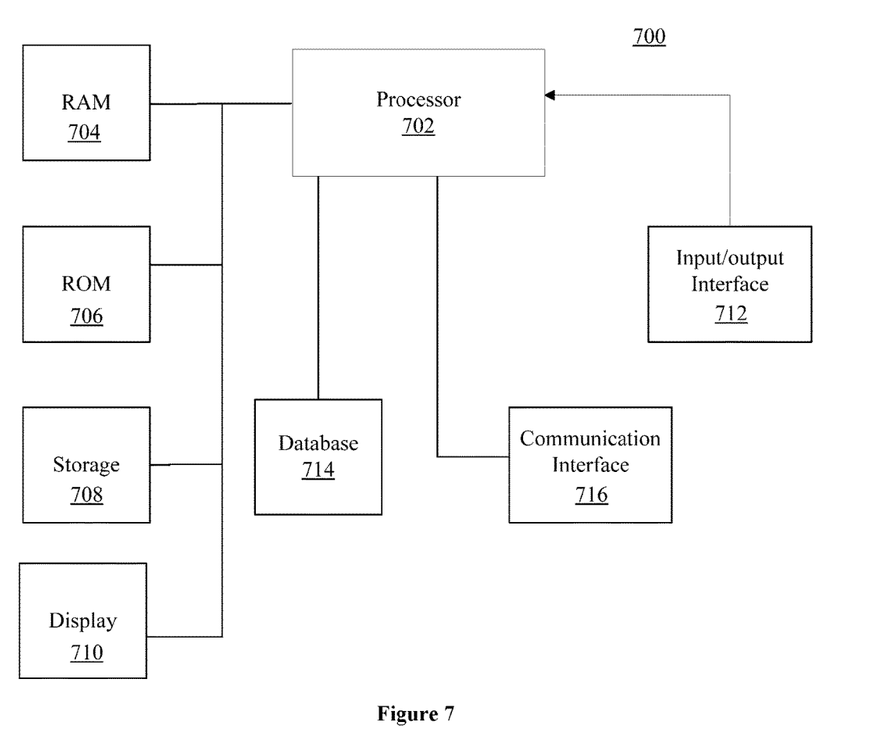
FIG. 7 illustrates the block diagram of an exemplary processing unit used in various disclosed embodiments of the present disclosure.

The array substrate may be connected to a processing unit. FIG. 7 illustrates an exemplary processing unit 700 used in some embodiments of the present disclosure The processing unit 700 may receive, process, and execute commands from the array substrate. The processing unit 700 may include any appropriately configured computer system. As shown in FIG. 7, the processing unit 700 may include a processor 702, a random access memory (RAM) 704, a read-only memory (ROM) 706, a storage 708, a display 710, an input/output interface unit 712, a database 714; and a communication interface 716. Other components may be added and certain components may be omitted without limiting the scope of the present disclosure.

Processor 702 may include any appropriate type of general purpose microprocessor, digital signal processor or microcontroller, and application specific integrated circuit (ASIC). Processor 702 may execute sequences of computer program instructions to perform various processes associated with the processing unit 700. Computer program instructions may be loaded into RAM 704 for execution by processor 702 from read-only memory 706, or from storage 708. Storage 708 may include any appropriate type of mass storage provided to store any type of information that processor 702 may need to perform the processes. For example, storage 708 may include one or more hard disk devices, optical disk devices, flash disks, or other storage devices to provide storage space.

Display 710 may provide information to a user or users of the processing unit 700. Display 710 may include any appropriate type of computer display device or electronic device display (e.g., CRT or LCD based devices). Input/output interface 712 may be provided for users to input information into the processing unit 700 or for the users to receive information from the processing unit 700. For example, input/output interface 712 may include any appropriate input device, such as a keyboard, a mouse, an electronic tablet, voice communication devices, or any other optical or wireless input devices. Further, input/output interface 712 may receive from and/or send to other external devices.

Further, database 714 may include any type of commercial or customized database, and may also include analysis tools for analyzing the information in the databases. Database 714 may be used for storing information for semiconductor manufacturing and other related information. Communication interface 716 may provide communication connections such that the processing unit 700 may be accessed remotely and/or communicate with other systems through computer networks or other communication networks via various communication protocols, such as transmission control protocol/internet protocol (TCP/IP), hyper text transfer protocol (HTTP), etc.

In one embodiment, a user may touch the display panel using a finger or a conductive stylus, and the processor 702 may receive, process, and execute the commands to obtain data from the touch motion. For example, the touch-sensing signal lines may transmit signals reflecting the touch motion to the processor, and the processor may receive, process, and execute commands based on the received signals. The communication interface can communicate with array substrate to collect and process data obtained from any activity. Suitable data may be stored in ROM 706 and storage 708 to be processed. After the data is processed, result of the self-monitoring can be obtained. The result can be returned to the user via the display 710 or the input/output interface 712.

Embodiment Four

Another aspect of the present disclosure provides a display apparatus. The display apparatus may incorporate one or more of the disclosed display panels. The display apparatus according to the embodiments of the present disclosure can be used in any product with display functions such as a television, an electronic paper, a digital photo frame, a mobile phone and a tablet computer.

It should be understood that the above embodiments disclosed herein are exemplary only and not limiting the scope of this disclosure. Without departing from the spirit and scope of this invention, other modifications, equivalents, or improvements to the disclosed embodiments are obvious to those skilled in the art and are intended to be encompassed within the scope of the present disclosure.

What is claimed is:

1. An array substrate, comprising:
    a plurality of first lines along a row direction;
    a plurality of second lines along a column direction intersecting with the plurality of first lines to form a plurality of pixel units comprising a plurality of pixel electrodes in rows and columns;
    a plurality of touch electrodes in rows along the row direction and columns along the column direction; and
    a plurality of auxiliary lines along the column direction;
    wherein:
        two first lines are between adjacent rows of pixel electrodes and two adjacent columns of the pixel electrodes form a pixel electrode group with one second line in between;
        each auxiliary line is between two adjacent pixel electrode groups, each touch electrode being connected to at least one auxiliary line for transferring touch signals;
        at least one auxiliary line includes a first portion and one or more second portions disconnected from the first portion at a position between two adjacent touch electrodes;
        the first portion electrically connects a touch electrode to a touch-sensing signal terminal, and each second portion is electrically connected to a different touch electrode that is disconnected from the first portion of a same auxiliary line along the column direction; and
        each second portion is continuously spreading across the touch electrode that is electrically connected to the second portion.

2. The array substrate according to claim 1, wherein each touch electrode is connected to a touch-sensing signal terminal through at least one touch-sensing signal line, the at least one touch-sensing signal line being connected to one touch-sensing signal terminal for transferring same touch signals, and a first portion of an auxiliary line being a touch-sensing signal line of a touch electrode.

3. The array substrate according to claim 2, wherein one touch electrode is electrically connected to two or more touch-sensing signal lines, the two or more touch sensing signal lines being connected to a same touch-sensing signal terminal for transferring same touch signals.

4. The array substrate according to claim 2, wherein:
each touch electrodes in a first row is connected to at least one touch-sensing signal line and is not connected to second portions of any auxiliary line; and
each touch electrodes in second rows is connected to at least one touch-sensing signal line and at least one second portion of an auxiliary line, wherein:
the first row is a row closest to the touch-sensing signal terminal, and the second rows are further away from the touch-sensing signal terminals than the first row.

5. The array substrate according to claim 4, wherein:
the touch electrodes in the second rows are each connected to at least one fewer second portion of an auxiliary line than an adjacent touch electrode along the column direction far away from the touch-sensing signal terminal.

6. The array substrate according to claim 1, wherein the auxiliary lines are in a same layer with at least one of the first lines and the second lines.

7. The array substrate according to claim 1, wherein the first lines are gate lines, and the second lines are data lines.

8. The array substrate according to claim 7, wherein the auxiliary lines are in a same layer with the data lines.

9. The array substrate according to claim 8, wherein the auxiliary lines and the data lines are in a same layer below the touch electrodes along a direction perpendicular to a plane of the array substrate.

10. The array substrate according to claim 8, wherein along a direction perpendicular to a plane of the array substrate, the auxiliary lines and the touch electrodes are in different layers, at least one auxiliary line being connected to corresponding touch electrodes through via holes.

11. The array substrate according to claim 1, wherein a touch electrode is electrically connected to at least one touch-sensing signal line.

12. The array substrate according to claim 1, wherein the touch electrodes are self-capacitance touch electrodes.

13. The array substrate according to claim 1, wherein the auxiliary lines being disconnected from touch electrodes are shielding wires for shielding electrical fields.

14. The array substrate according to claim 1, further including common electrodes, wherein at least a portion of the common electrodes are touch electrodes.

15. The array substrate according to claim 1, wherein the first lines are data lines and the second lines are gate lines.

16. A display panel, comprising one or more of the array substrate according to claim 1.

17. The display panel according to claim 16, further including a processing unit, wherein the touch-sensing signal terminals are connected to a processing unit for configuring a touch motion.

18. A display apparatus, comprising one or more of the display panels according to claim 16.

19. The array substrate according to claim 1, wherein the first portion is continuously spreading across at least one touch electrode including the touch electrode that is electrically connected to the touch-sensing signal terminal.

20. An array substrate, comprising:
a plurality of first lines along a row direction;
a plurality of second lines along a column direction intersecting with the plurality of first lines to form a plurality of pixel units comprising a plurality of pixel electrodes in rows and columns;
a plurality of touch electrodes in rows along the row direction and columns along the column direction;
a plurality of auxiliary lines along the column direction; wherein:
two first lines are between adjacent rows of pixel electrodes and two adjacent columns of the pixel electrodes form a pixel electrode group with one second line in between;
each auxiliary line is between two adjacent pixel electrode groups; and
each touch electrode is electrically connected to a touch-sensing signal terminal through a group of touch-sensing signal lines, each group of touch-sensing signal lines including two or more of the auxiliary lines of a consecutive sequence.

* * * * *